United States Patent
Zhou

(10) Patent No.: US 9,034,953 B2
(45) Date of Patent: May 19, 2015

(54) SURFACE TREATMENT COMPOSITION, INKJET PRINTABLE ARTICLE AND METHOD OF MAKING THE SAME

(75) Inventor: Xiaoqi Zhou, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 653 days.

(21) Appl. No.: 13/001,421

(22) PCT Filed: Jun. 27, 2008

(86) PCT No.: PCT/US2008/068662
§ 371 (c)(1),
(2), (4) Date: Dec. 24, 2010

(87) PCT Pub. No.: WO2009/157952
PCT Pub. Date: Dec. 30, 2009

(65) Prior Publication Data
US 2011/0104407 A1    May 5, 2011

(51) Int. Cl.
C08L 3/00 (2006.01)
D21H 19/54 (2006.01)
B41M 5/00 (2006.01)
B41M 5/52 (2006.01)
C09D 11/322 (2014.01)

(52) U.S. Cl.
CPC ............ *B41M 5/0035* (2013.01); *B41M 5/52* (2013.01); *C09D 11/322* (2013.01); *B41M 5/5218* (2013.01); *B41M 5/5236* (2013.01); *B41M 5/5254* (2013.01); *B41M 2205/34* (2013.01)

(58) Field of Classification Search
USPC .................................................. 524/399, 47
See application file for complete search history.

(56) References Cited

U.S. PATENT DOCUMENTS

| | | |
|---|---|---|
| 3,630,830 A | 12/1971 | Herdle et al. |
| 4,040,862 A | 8/1977 | Voigt et al. |
| 4,659,430 A | 4/1987 | Tamagawa et al. |
| 4,872,951 A | 10/1989 | Maliczyszyn et al. |
| 6,207,258 B1 | 3/2001 | Varnell |
| 6,540,877 B1 | 4/2003 | Katz et al. |
| 6,761,942 B2 * | 7/2004 | Katoh et al. ............... 428/32.31 |
| 6,880,928 B2 | 4/2005 | Hosoi et al. |
| 8,256,887 B2 * | 9/2012 | Zhou et al. ..................... 347/101 |
| 2002/0039639 A1 * | 4/2002 | Kondo et al. .................. 428/195 |
| 2003/0037895 A1 | 2/2003 | Lunkenheimer et al. |
| 2004/0033377 A1 * | 2/2004 | Koenig .......................... 428/458 |
| 2005/0107254 A1 * | 5/2005 | Ogino et al. ................... 503/200 |
| 2005/0217815 A1 | 10/2005 | Stoffel et al. |
| 2006/0210729 A1 | 9/2006 | Taka et al. |
| 2006/0228499 A1 | 10/2006 | Tran et al. |
| 2007/0087138 A1 | 4/2007 | Koenig et al. |
| 2007/0125267 A1 | 6/2007 | Song et al. |
| 2012/0012264 A1 * | 1/2012 | Zhou et al. .................... 162/169 |

FOREIGN PATENT DOCUMENTS

| | | |
|---|---|---|
| EP | 0827842 A1 | 3/1998 |
| JP | 63285540 | 11/1988 |
| WO | WO 96/35841 | 11/1996 |
| WO | WO 03/104336 A2 | 12/2003 |
| WO | WO 2007/044228 | 4/2007 |

OTHER PUBLICATIONS

SciFinder (CAS Registry No. 1327-41-9).*
Chemicalland21 (Polyaluminum chloride).*
International Search Report and Written Opinion for PCT/US2008/068662 dated Mar. 26, 2009 (13 pages).
International Preliminary Report on Patentability for PCT/US2008/068662 dated Jan. 13, 2011 (8 pages).
European Search Report for EP08772201 PCT/US2008/068662 dated Sep. 25, 2012 (5 pages).

* cited by examiner

*Primary Examiner* — Wenwen Cai
(74) *Attorney, Agent, or Firm* — Dierker & Associates, P.C.

(57) ABSTRACT

A surface treatment composition for inkjet media includes: at least one surface sizing agent selected from the group consisting of starch, starch derivatives, polymeric materials, and combinations thereof; and an ink fixative selected from the group consisting of at least one high valence metallic salt, at least one high valence complex poly-salt, and combinations thereof. The ink fixative is present in the surface treatment composition from about 10 weight% to about 50 weight% of the surface treatment composition. The at least one high valence metallic salt and the at least one high valence complex poly-salt have a valence greater than divalent. Additionally included are a method of making and a system for printing the surface treated media; and an inkjet printable paper.

15 Claims, 1 Drawing Sheet

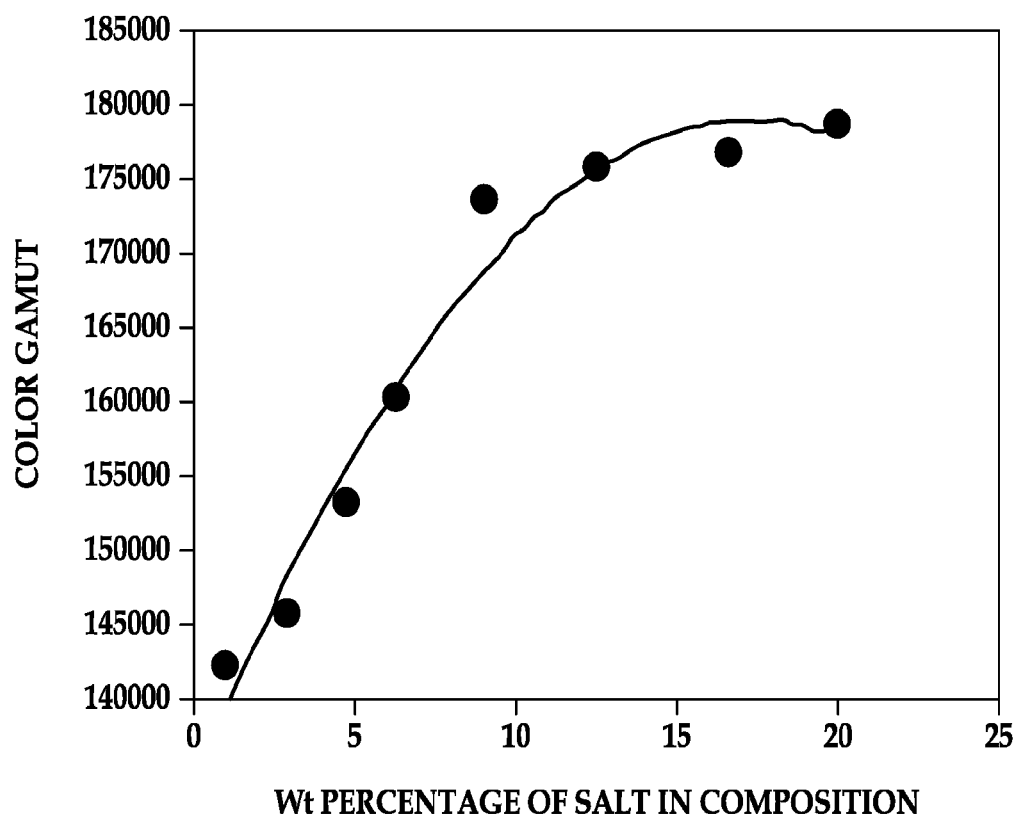

SURFACE TREATMENT COMPOSITION, INKJET PRINTABLE ARTICLE AND METHOD OF MAKING THE SAME

BACKGROUND

The present disclosure relates generally to printing media used with the latest digital printing technology, e.g. thermal inkjet printers, especially ones using pigmented inks. Such high quality, low cost printing equipment does not always work at an optimum level with traditional printing papers. Furthermore, issues relating to cost, image quality, environmental impact and mechanical ease of use (e.g. minimal paper jams) all must be addressed with these products. Pigmented inks make the resolution of such problems more complex because of the differences with the way pigment particles react with media in comparison with dye molecules in dye based inks. Image qualities such as ink bleed, black optical density and color saturation are greatly dependent upon the diffusion and/or interaction of pigmented ink with printing papers. Another problem that occurs is "image strike through," when images printed on one side come through to the other side of the paper. An additional problem is extended ink dry time which refers to the time it takes for the ink to dry such that it will not smear or transfer to other surfaces.

It has been found that divalent salt, such as calcium chloride, as an additive in the surface sizing layer added during the media making process, can react with the pigments in the ink. By this means, the pigment colorant can be made to stay on the outermost layer of the media. This increases the optical density of the image on the media and reduces the dry time. However, to achieve such effects, the divalent salt needs to be used at a concentration greater than from about 6 to about 12 kg salt per ton (T) of paper. Such a high loading of chloride-containing compounds may promote drastic corrosion of the paper milling equipment used to produce the print media, and may significantly reduce the life span of the salt-contacting parts of the paper manufacturing equipment, such as, e.g., sizing rolls.

Another drawback commonly associated with the use of calcium chloride salt arises from its exothermic dissolution in water. A significant amount of heat is produced when large batches of calcium chloride salt solution is prepared, as is customary in commercial paper manufacturing processes. Solution temperatures can easily reach from about 90° C. to about 100° C. or more. The chloride-containing vapors from such a heated solution may, in some instances, cause potential environmental issues for workers involved with the mixing process. Further, the divalent salts like calcium chloride or magnesium chloride are very moisture-absorbent. The use of this type of salt can easily change the stiffness of the paper due to absorption of water into the paper. This inevitably causes some issues related to the runnability of the media in the print. These issues can cause, for example, paper jamming and/or multi-picking of the sheets from a paper tray.

BRIEF DESCRIPTION OF THE DRAWING

Features and advantages of embodiments of the present disclosure will become apparent by reference to the following detailed description and drawing, in which:

FIG. 1 is a graph showing color gamut vs. weight percentage of salt in the composition.

DETAILED DESCRIPTION

The inkjet printing media of the present application includes a base stock and a surface treatment composition. The surface treatment composition can be applied on either one or both sides of the base stock. Non-limiting examples of base stocks include cellulose paper, polymeric film and cellulose paper laminate which are coated by polymeric materials on one or both sides of the base stock. The basis weight of the base stock ranges from about 35 gsm to about 250 gsm.

The substrate used to make inkjet printing media can include cellulose fibers. The type of fiber is not critical, and any such fiber known for use in paper-making can be used. For example, the substrate can be made from pulp fibers derived from hardwood trees, softwood trees, or a combination of hardwood and softwood trees prepared for use in papermaking fiber furnished by any known suitable digestion, refining, and bleaching operations as are, for example, known in mechanical, thermomechanical, chemical and semichemical, etc., pulping and other well-known pulping processes. The term "hardwood pulps" refers to fibrous pulp derived from the woody substance of deciduous trees (angiosperms) such as birch, oak, beech, maple, and eucalyptus. The term "softwood pulps" refers to fibrous pulps derived from the woody substance of coniferous trees (gymnosperms) such as varieties of fir, spruce, and pine, as for example loblolly pine, slash pine, Colorado spruce, balsam fir and Douglas fir. In certain embodiments, at least a portion of the pulp fibers may be provided from non-woody herbaceous plants including, but not limited to, kenaf, hemp, jute, flax, sisal, or abaca. Either bleached or unbleached pulp fiber may be utilized in the process of this disclosure. Recycled pulp fibers are also suitable for use. In an embodiment, the cellulosic fibers in the paper include from about 30% to about 100% by weight hardwood fibers, and from about 0% to about 70% by weight softwood fibers.

Additionally, a number of fillers may be included in the above-mentioned pulps during formation of the substrate. According to one exemplary embodiment, the fillers that may be incorporated into the pulp to control physical properties of the final substrate include, but are in no way limited to, ground calcium carbonate, precipitated calcium carbonate, titanium dioxide, kaolin clay, silicates, and combinations thereof. As incorporated in the present example system and method, the amount of fillers may vary widely. However, according to one embodiment, the fillers (if used) represent from approximately 0% to approximately 40% by weight of the dry fibers; and according to another embodiment, the filler represents from approximately 10% to approximately 20% by weight of the dry fibers.

The capability and speed of the base stock to absorb aqueous solvent is an important aspect of the inkjet printing media of the present application. Excessive absorption will bring the colorant into the bulk area of the base, generally resulting in low black and color optical density and low color gamut. This will create a "washed out" image. Poor absorption, on the other hand, creates a situation in which the ink bleeds and smears readily. Furthermore, poor absorption also necessitates an increase in dry time.

Aqueous solvent absorption in base stock is primarily controlled by the sizing processing on the base stock. This includes both the process of internal sizing and surface sizing. During the process of internal sizing, chemicals are added to the papermaking furnish and retained on the fiber by appropriate means in the wet end of the papermaking system before the pulp suspension is converted to a paper web or substrate. By this means, resistance to wetting and penetration by liquids is controllable.

The internal sizing agents for use in this application encompass all those commonly used at the wet end of a paper machine. For example, internal sizing agents include but are not limited to: starch; carboxymethylcellulose (CMC); polyvinyl alcohol; methyl cellulose; alginates; waxes; wax emulsions; alkylketene dimer (AKD); alkyl succinic anhydride (ASA); alkenyl ketene dimer emulsion (AKD); emulsions of ASA or AKD with cationic starch; ASA incorporating alum; rosin sizes; ketene multimers; and combinations of such sizing agents. The internal sizing agents are generally used at concentration levels normal for the art of papermaking. For example, a concentration of internal sizing agents from about 0.01 weight % to about 0.5 weight % based on the weight of the dry paper sheet would be considered normal, but an optimum amount is decided according to absorption requirements as described below.

The degree of internal sizing can be characterized in terms of how much the paper stock absorbs the aqueous solvents, and how quickly the aqueous solvent penetrates through the paper stock. The Cobb test is used for measurement of liquid absorption, where one surface of the paper sample is exposed under a given hydrostatic head to water under a specified time, i.e., 60 seconds with the circular area of the sample being 100 cm$^2$. After a fixed time of 60 seconds, the water is decanted, and excess water is blotted off. The water absorbed in terms of gram per square meter (gsm) is used to evaluate absorption capability. To obtain optimum printing results in the instant disclosure, the internal sizing agents should be applied in an amount that yields a Cobb value in the range from about 20 to about 50 gsm. An even better result can be achieved in the range from about 25 gsm to about 40 gsm. The penetration property of the paper sample is determined by the Hercules Size Test (HST) method, where a green dyed (Naphtol Green B) formic acid solution is used to determine the time spent to reach the 80% of remitted monochromatic light. To achieve the optimum printing quality, the value of the HST test should be controlled from about 25 seconds to about 400 seconds.

In the surface sizing process, a surface sizing composition is applied to the surface of the paper web. Specifically in this disclosure, a surface treatment composition can be the surface sizing composition applied to the surface of the paper web. By such a fiber surface modification process, not only the integrity of the fabric web structure is improved, but also the absorbency, repellency and spreading of the aqueous liquid can be controlled at a desired level so that ink absorption and penetration are optimized to produce a better image. Further in the instant disclosure, the media surface is modified to become more "adaptable" to the pigmented inkjet inks. In an embodiment, the surface treatment composition includes at least one surface sizing agent as well as at least one high valence metallic salt such as a trivalent salt as colorant fixer. The surface sizing agents can include starches and/or starch derivatives; carboxymethylcellulose (CMC); methyl cellulose; alginates; waxes; wax emulsions; alkylketene dimer (AKD); alkyl succinic anhydride (ASA); alkenyl ketene dimer emulsion (AKD); emulsions of ASA or AKD with cationic starch; ASA incorporating alum; water-soluble and/or water-dispersible polymeric materials; and combinations thereof.

Such water-soluble and/or water-dispersible polymeric materials can include polyvinyl alcohol; gelatin; cellulose derivatives; acrylamide polymers; acrylic polymers or copolymers; vinyl acetate latex; polyesters; vinylidene chloride latex; styrene-butadiene; acrylonitrile-butadiene copolymers; styrene acrylic polymers and copolymers; and combinations thereof. Examples of starches include corn starch, tapioca starch, wheat starch, rice starch, sago starch and potato starch. These starch species can be unmodified starch, enzyme modified starch, thermal and thermal-chemical modified starch and chemically modified starch. In one embodiment, the chemically modified starch is used, which includes, but is not limited to, converted starches such as acid fluidity starches; oxidized starches and pyrodextrins; derivatized starches such as hydroxyalkylated starches; cyanoethylated starch; cationic starch ethers; anionic starches; starch esters; starch grafts; and hydrophobic starches. Non-limitative examples of other suitable surface sizing agents also include styrene-based emulsion polymers, AKD, and/or combinations thereof.

The surface treatment composition includes at least one ink fixative made of high valence metallic salt ("high valence" being defined as greater than the valence of a divalent salt), such as trivalent salts. The pigmented ink for inkjet printing is usually an aqueous suspension system, where the pigmented colorants are dispersed into the aqueous vehicle to form a stable ink suspension. When pigmented ink drops are ejected on the surface of the media of the instant disclosure, the salts are firstly able to "crash-out" the pigmented ink suspension ("crash-out" being defined as precipitating or causing the precipitation of pigments or dyes out of dispersion or solution in an ink) so that the colorants, for example like color pigments, can quickly separate from the ink vehicle and stay on the outmost surface of the media, while the aqueous ink vehicle can be readily absorbed into the paper base stock and evaporated gradually. Secondly, these salts need to be able to chemically, physically, and/or electrostatically bind the pigmented colorant materials at or near the outer surface of the printing media. By this means, a high degree of water-fastness, smear-fastness, and overall image stability is obtained. Another function of the fixatives is to reduce the ink dry time. One embodiment of the high valence salt is the water-soluble or water-dispersible trivalent aluminum salts. The term "water-soluble or water-dispersible aluminum salts" encompasses all salts of aluminum which are sufficiently water-soluble or water-dispersible to function effectively in the surface treatment composition. In an embodiment, these salts have at least some ionic character. Examples of such ionic salts include aluminum acetate, aluminum bromate, aluminum bromide and the hexa- and pentadecyl hydrates thereof, aluminum ammonium sulfate, aluminum sodium sulfate, aluminum chlorate, aluminum citrate, aluminum chloride and the hexahydrate thereof, aluminum fluoride, aluminum iodide and the hexahydrate thereof, aluminum lactate, aluminum nitrate, aluminum stearate, aluminum sulfate, aluminum tartrate, aluminum triformate, aluminum formoacetate and the hydrate thereof. Of the above-listed salts, the following are particularly effective: aluminum chloride, aluminum bromide, aluminum fluoride, aluminum iodide, aluminum nitrate, aluminum sulfate, aluminum citrate, and aluminum lactate. Of these, aluminum chloride, aluminum sulfate, aluminum fluoride and aluminum citrate are even more effective than the others.

The salts that can be used in accordance with the present disclosure also include complex poly-salts with high valence such as polyaluminum chloride, polyaluminum hydroxychloride; polyaluminol ACH; polyaluminum chlorohydrate; aluminum chlorhydroxide; aluminum chloride hydroxide oxide, basic; poly-aluminum chlorohydrol, or aluminum chlorohydroxide. These polyaluminum chloride or polyaluminum hydroxychloride salts are made by partially reacting aluminum chloride (ACH) with a base. The relative amount of OH compared to the amount of Al can determine the basicity of a particular product. As a non-limiting example, the high valence ionic composition that can be formed from polyaluminum hydroxychloride are $[Al_6(OH)_{15}]^{3+}$, $[Al_{12}(OH)_{24}AlO_4(H_2O)_{12}]^{7+}$, $[Al_8(OH)_{20}]^{4+}$, $[Al_{21}(OH)_{60}]^{3+}$, and $[Al_{13}$ $(OH)_{34}]^{5+}$. One of the notable characteristics of the poly-salts is solubility in water. The ionic composition formed has a basic (as opposed to acidic) nature, and it is stable with cationically-charged high valence centers.

In an embodiment, high valence salts of the instant application are added to water to form an aqueous solution/suspension. The aqueous solution/suspension of the salt is added to the surface sizing agent solution, e.g. starch solution. In some instances, the surface sizing agent contains both starch and a synthetic sizing agent. For example, the pick-up amount of starch is from about 0.5 to about 3 grams per square meter (gsm) per paper side, and the amount of synthetic surface sizing agent is in the range of from 0 to about 6 kg/T of base paper stock.

To achieve the optimum effect in improving the inkjet image quality, an "effective" amount of salts is needed in the surface treatment composition. The effective amount of the salt ranges from about 10% to about 50% by dry weight in the surface treatment composition, and preferably, in the range of from about 15% to about 25% by dry weight in the surface treatment composition. If the salt usage is lower than the minimum amount of about 10% by dry weight in the surface treatment composition, a low image quality print-out will appear.

The surface treatment composition can be applied on base paper stock by a surface size press process such as a puddle-size press and a film-size press, or other similar press types. The puddle-size press can be configured with any of horizontal, vertical and inclined rollers. The film-size press can include a metering system, such as gate-roll metering, blade metering, Meyer rod metering, or slot metering. For some embodiments, a film-size press with short-dwell blade metering can be used as an application head to apply the coating solution. A calendaring process can optionally be used after drying the surface treatment composition to improve the surface smoothness and gloss.

In order to test the image attributes conferred on a media surface treated with the surface treatment composition of the instant disclosure, various methods and approaches may be used. Of the image attributes in a print-out, the black ink optical density (KOD), color gamut and printed line raggedness were found to be the most important attributes to characterize the image quality.

Black optical density (KOD) is the measurement of the change in reflectance $OD=\log_{10}(I_i/I_r)$, where $I_i$ and $I_r$ are incident and reflected light intensities, respectively. The higher the KOD value, the darker the black colored image obtained.

Color gamut refers to the subset of colors which can be accurately represented in a given circumstance, such as within a given color space like CIE 1976 (L*, a*, b*) color space. The bigger the color gamut volume, the more vivid in color is the resulting colored image.

Line raggedness refers to the average of the leading edge and trailing edge raggedness of a printed line, and it measures the appearance of geometric distortion of an edge from its ideal position. A high line raggedness value indicates greater geometric distortion of an edge, and the image will reveal some defects like feathering and bleeding.

To further illustrate embodiment(s) of the present disclosure, examples are given herein. It is to be understood that these examples are provided for illustrative purposes and are not to be construed as limiting the scope of the disclosed embodiment(s).

EXAMPLES

Example 1

Preparation of Paper Base Stock and Surface Treatment Composition

Paper substrates were made on a paper machine from a fiber furnish consisting of 30% softwood and 50% hardwood fibers and 12% precipitated calcium carbonate with alkenyl succinic anhydride (ASA) internal size. The basis weight of the substrate paper was about 75 gsm.

Surface sizing composition was prepared in the laboratory using a 55 gallon jacked processing vessel made of stainless steel (A&B Processing System Corp., Stratford, Wis.). A Lighthin® mixer (Lighthin Ltd., Rochester N.Y.) with a 5:1 gear ratio and a speed of 1500 rpm was used to mix the formulation. The starches and their derivatives which were used as the surface sizing agent were first pre-cooked at 95° C. for 2 hours and cooled to room temperature. An amount of pre-cooked starch was added to the mixing container. This was followed by adding into the mixture the water, and then the other additives such as fluorescent whitening agents (FWA) and pH buffer. The tri-valent salt, aluminum sulfate octadecahydrate, was pre-dissolved and filtered, and then mixed with starch. An effective mixing speed can be achieved with a range between about 500 rpm and about 1000 rpm.

Surface treated ink-jet printing media was prepared by applying the resulting surface sizing composition by hand drawdown using a Meyer rod, or a laboratory coater. By controlling the formulation solids, rod size, nip pressure, and machine running speed, an effective pickup weight of the surface treatment composition was achieved. Effective pickup weight conditions can be achieved in a range from about 0.5 gsm to about 5.0 gsm per side. The treated sheets were dried by a hand-held drier for about 5 to 10 minutes. Effective drying conditions can be achieved with a handheld drier or in a drying oven, either of which applies heat at a temperature ranging from about 80° C. to about 120° C.

Example 2

Black Optical Density Comparison of Inkjet Printing Media Containing Different Salts The black optical density of the print media samples prepared as described in Example 1 were tested in order to compare the image quality with other commercial media containing different types of salts.

The samples were printed using a PhotoSmart Pro B9180 printer with pigmented black and color inks, manufactured by Hewlett-Packard Co. The black optical density was measured using an X-Rite densitometer to measure the reflectance of the area filled. The results were listed in Table 1.

TABLE 1

| SAMPLE | Black optical density | Color gamut | Line raggedness (micrometer) |
|---|---|---|---|
| Example 2* | 1.39 | | |
| Example 3* | | 177800 | |
| Example 4* | | | 8.70 |
| Commercial paper with $CaCl_2$ | 1.41 | 176200 | 12.40 |

*Salt amount is 16.7% by dry weight of surface treatment composition

Example 3

Color Gamut Comparison of Inkjet Printing Media Containing Different Salts

The color gamut of the print media samples prepared as described in Example 1 were tested to compare the image quality with other commercial media containing different types of salts.

The samples were printed using a PhotoSmart Pro B9180 printer with pigmented black and color inks, manufactured by Hewlett-Packard Co. The color gamut measurements were carried out on squares of primary color (cyan, magenta, and yellow) and secondary colors (red, green, and blue) plus white (un-imaged sheets) and black colors. L*a*b* values of these squares were first measured and thereafter were used to calculate the 8-point color gamut, where the higher value of color gamut indicates that the prints showed richer or more saturated colors. The results were listed in Table 1.

Example 4

Line Raggedness Comparison of Inkjet Printing Media Containing Different Salts The line raggedness of the print media samples prepared as described in Example 1 were tested in order to compare the image quality with other commercial media containing different type of salts. In this evaluation, media samples were imaged as black line or black lines on a yellow background with a PhotoSmart Pro B9180 printer with pigmented black and color inks, manufactured by Hewlett-Packard Co. The samples were then allowed to air dry. The edge acuity of the black-to-yellow bleed was measured with a QEA Personal Image Analysis System (Quality Engineering Associates, Burlington, Mass.). Smaller values were indicative of better edge quality of the printed image. The results were listed in Table 1.

Example 5

Influence of Tri-Valent Salt Amount on Image Quality

The aluminum sulfate octadecahydrate was used as the ink fixative in the surface treatment composition as described in Example 1. When aluminum sulfate octadecahydrate increased, the image quality, as represented by color gamut, was increased, but a significant improvement only happened when the weight percentage of salt was over 10 weight % in the surface treatment composition.

Various color gamut results from this Example 5 for samples of colored inks having various weight percent concentrations of aluminum sulfate octadecahydrate salts in the surface treatment composition were graphed in FIG. 1. As can be seen in FIG. 1, samples which had higher salt concentration from around 15 weight % up to around 25 weight % also had higher color gamut.

Example 6

Print Quality (PQ) Improvement by High Valence Salt

The paper substrates used in this experiment were made on a paper machine from a fiber furnish consisting of 30% softwood and 50% hardwood fibers and 12% precipitated calcium carbonate with alkenyl succinic anhydride (ASA) internal size. The basis weight of the substrate paper was about 75 gsm.

The surface sizing composition was prepared in the laboratory using a 55 gallon jacked processing vessel made by stainless steel (A&B Processing System Corp., Stratford, Wis.). A Lighthin® mixer (Lighthin Ltd., Rochester N.Y.) mixer with a 95:1 gear ratio and a speed of 1500 rpm was used to mix the formulation. When the starches or their derivatives were used as the surface sizing agent, they were first pre-cooked at 95° C. for 2 hours and cooled to room temperature. An amount of pre-cooked starch was added to the mixing container, then the water was added, and then the other additives such as fluorescent whitening agents (FWA) and pH buffer were added. Basic polyaluminum chlorohydrate salts were pre-dissolved and filtered to generate a high valence ionic solution of $[Al_8(OH)_{20}]^{4+}$. These were then mixed with starch mixture in a weight percentage of 14.8%. Effective mixing conditions can be achieved under these conditions in a range between about 500 rpm and about 1000 rpm.

Surface treated ink-jet printing media was prepared by applying the resulting surface sizing composition either by hand drawdown using a Meyer rod. By controlling the formulation solids, rod size, nip pressure, and machine running speed, an effective pickup weight of surface treatment composition was achieved. Effective pick up weight can be achieved in a range between 500 rpm and 1000 rpm. The treated sheets were dried for 20 minutes. Effective drying conditions can be achieved with either a handheld drier or a drying oven, either of which applies a temperature ranging between 80° C. and 120° C.

The samples were printed using a PhotoSmart Pro B9180 printer with pigmented black and color inks, manufactured by Hewlett-Packard Co. The black optical density, color gamut and line raggedness were measured using the method described in Examples 2-4. The results are listed in Table 2.

TABLE 2

| Fixative | Wt % in surface treatment composition | Color gamut | KOD | Line raggedness (micrometer) |
| --- | --- | --- | --- | --- |
| Commercial paper with $CaCl_2$ | N/A | 176200 | 1.41 | 12.40 |
| Commercial paper with NaCl | N/A | 105300 | 0.86 | 20.70 |
| $CaCl_2$ | 16.7% | 181200 | 1.39 | 10.50 |
| Basic polyaluminum chlorohydrate salt | 14.8% | 172400 | 1.37 | 8.75 |

While several embodiments have been described in detail, it will be apparent to those skilled in the art that the disclosed embodiments may be modified. Therefore, the foregoing description is to be considered exemplary rather than limiting.

What is claimed is:

1. A surface treatment composition for inkjet media, consisting of:
   at least one surface sizing agent selected from the group consisting of starch, starch derivatives, and combinations thereof;
   an ink fixative selected from the group consisting of aluminum sulfate octadecahydrate, aluminum bromide hexahydrate, aluminum bromide pentadecyl hydrate, aluminum hexahydrate, aluminum iodide hexahydrate, aluminum formoacetate hydrate and polyaluminum hydroxychloride; and water;

wherein the ink fixative is present in the surface treatment composition from about 10 weight % to about 50 weight % of the surface treatment composition.

2. The surface treatment composition of claim 1 wherein the ink fixative is present in the surface treatment composition from about 15 weight % to about 25 weight %.

3. The surface treatment composition of claim 1 wherein the at least one surface sizing agent comprises the starch derivatives, and wherein the starch derivatives are selected from the group consisting of potato derivatives, corn derivatives, tapioca derivatives, cationic starch, anionic starch, oxidized starch, starch esters, starch ethers, starch acetates, starch phosphates, and combinations thereof.

4. The surface treatment composition of claim 1 wherein the surface treatment composition is applied on the inkjet media, and wherein the inkjet media includes base stock, the base stock being selected from the group consisting of cellulose paper, polymeric film, and cellulose paper coated with polymeric materials on one or both sides.

5. The surface treatment composition of claim 4 wherein the base stock is cellulose paper selected from the group consisting of wood pulp, wood-free pulp, and combinations thereof.

6. The surface treatment composition of claim 1 wherein the surface treatment composition is applied on the inkjet media, and wherein the inkjet media includes base paper stock sized with internal sizing agents, the internal sizing agents being selected from the group consisting of rosin sizes, ketene dimers, ketene multimers, alkenylsuccinic anhydrides, and combinations thereof.

7. The surface treatment composition of claim 1 wherein the ink fixative is aluminum sulfate octadecahydrate.

8. The surface treatment composition of claim 1 wherein the ink fixative is polyaluminum hydroxychloride.

9. A method of making surface-treated inkjet media, the method comprising:

applying the surface treatment composition of claim 1 to a base stock treated with internal sizing agents.

10. The method according to claim 9 wherein the internal sizing agents are selected from the group consisting of carboxymethylcellulose; polyvinyl alcohol; methyl cellulose; alginates; waxes; wax emulsions; alkylketene dimer; alkyl succinic anhydride; alkenyl ketene dimer emulsion; emulsions of alkyl succinic anhydride with cationic starch; emulsions of alkenyl ketene dimer emulsion with cationic starch; alkyl succinic anhydride incorporating alum; rosin sizes; ketene multimers; water-soluble polymeric materials; water-dispersible polymeric materials; and combinations thereof;

and wherein the base stock treated with the internal sizing agents has a Cobb value in a range from about 20 gsm to about 50 gsm.

11. The method of claim 9 wherein the at least one surface sizing agent comprises the starch derivatives, and wherein the starch derivatives are selected from the group consisting of potato derivatives, corn derivatives, tapioca derivatives, cationic starch, anionic starch, oxidized starch, starch esters, starch ethers, starch acetates, starch phosphates, and combinations thereof.

12. A system of inkjet printing inkjet media treated with the surface treatment composition of claim 1, the system comprising:

an inkjet printer;

pigment based ink; and the inkjet media treated with the surface treatment composition of claim 1.

13. Inkjet printable paper, comprising:

a base stock treated with internal sizing agents selected from the group consisting of carboxymethylcellulose; polyvinyl alcohol; methyl cellulose; alginates; waxes; wax emulsions; alkylketene dimer; alkyl succinic anhydride; alkenyl ketene dimer emulsion; emulsions of alkyl succinic anhydride with cationic starch; emulsions of alkenyl ketene dimer emulsion with cationic starch; alkyl succinic anhydride incorporating alum; rosin sizes; ketene multimers; water-soluble polymeric materials; water-dispersible polymeric materials; and combinations thereof, wherein the base stock treated with the internal sizing agents has a Cobb value in a range from about 20 gsm to about 50 gsm; and a surface coated with the surface treatment composition of claim 1.

14. The inkjet printable paper of claim 13 wherein the base stock is selected from the group consisting of cellulose paper, polymeric film, and cellulose paper coated with polymeric materials on one or both sides.

15. The inkjet printable paper of claim 13 wherein the base stock is cellulose paper selected from the group consisting of wood pulp, wood-free pulp, and combinations thereof.

* * * * *